(12) United States Patent
Tune et al.

(10) Patent No.: US 9,977,742 B2
(45) Date of Patent: May 22, 2018

(54) CACHE COHERENCY (71) Applicant: ARM LIMITED, Cambridge (GB)

(72) Inventors: Andrew David Tune, Dronfield (GB); Sean James Salisbury, Appley Bridge (GB)

(73) Assignee: ARM Limited, Cambridge (GB)

( * ) Notice: Subject to any disclaimer, the term of this patent is extended or adjusted under 35 U.S.C. 154(b) by 69 days.

(21) Appl. No.: 15/133,311

(22) Filed: Apr. 20, 2016

(65) Prior Publication Data

US 2016/0350219 A1 Dec. 1, 2016

(30) Foreign Application Priority Data

Jun. 1, 2015 (GB) .................................. 1509424.6

(51) Int. Cl.
*G06F 12/08* (2016.01)
*G06F 12/0817* (2016.01)
(Continued)

(52) U.S. Cl.
CPC ...... *G06F 12/0817* (2013.01); *G06F 12/0833* (2013.01); *G06F 12/12* (2013.01); *G06F 2212/1016* (2013.01)

(58) Field of Classification Search
CPC .... G06F 12/082; G06F 12/0817; G06F 12/12; G06F 12/0833; G06F 12/0815;
(Continued)

(56) References Cited

U.S. PATENT DOCUMENTS 6,868,481 B1 3/2005 Gaither et al.
9,244,845 B2 * 1/2016 Rowlands ........... G06F 12/0831
(Continued)

OTHER PUBLICATIONS

Search and Exam Report for GB 1509424.6, dated Dec. 11, 2015, 5 pages.

*Primary Examiner* — Hashem Farrokh
(74) *Attorney, Agent, or Firm* — Nixon & Vanderhye P.C.

(57) ABSTRACT

A cache coherency controller comprises a directory indicating, for memory addresses cached by a group of two or more cache memories in a coherent cache structure, which of the cache memories are caching those memory addresses, the directory being associative so that multiple memory addresses map to an associative set of more than one directory entry; and control logic responsive to a memory address to be newly cached, and configured to detect whether one or more of the set of directory entries mapped to that memory address is available for storage of an indication of which of the two or more cache memories are caching that memory address; the control logic being configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection amongst the two or more cache memories.

11 Claims, 4 Drawing Sheets

(51) Int. Cl.
*G06F 12/0831* (2016.01)
*G06F 12/12* (2016.01)

(58) Field of Classification Search
CPC ............. G06F 12/0897; G06F 12/0811; G06F 12/121; G06F 2212/1016; G06F 2212/283; G06F 2212/1044; G06F 12/08
See application file for complete search history.

(56) References Cited

U.S. PATENT DOCUMENTS

| | | | |
|---|---|---|---|
| 2003/0079086 A1* | 4/2003 | Shanahan | G06F 12/082 711/133 |
| 2007/0055826 A1* | 3/2007 | Morton | G06F 12/0817 711/141 |
| 2007/0079072 A1 | 4/2007 | Collier et al. | |
| 2010/0180084 A1* | 7/2010 | Cypher | G06F 12/0817 711/135 |
| 2014/0052930 A1* | 2/2014 | Gulati | G06F 11/22 711/141 |
| 2014/0082297 A1 | 3/2014 | Solihin | |
| 2015/0052313 A1* | 2/2015 | Ghai | G06F 9/467 711/136 |

\* cited by examiner

CACHE COHERENCY

This application claims priority to GB Patent Application No. 1509424.6 filed 1 Jun. 2015, the entire content of which is hereby incorporated by reference.

BACKGROUND

This disclosure relates to cache coherency.

Some so-called cache coherent systems, in which consistency is maintained or at least monitored across multiple potential copies of the same data, make use of cache coherency controllers. A cache coherency controller, or "point of coherence" or "home node" is responsible for overseeing accesses to memory addresses and may use a so-called snoop filter for checking whether a cached version of a memory address to be accessed is held by another cache in the cache coherent system.

In order to avoid making unnecessary snoop enquiries, a snoop filter may maintain a directory indicating which memory addresses are held by which caches in the system. Such a directory may be inclusive, in that it attempts to store all of that information for all of the caches. As an example, an associative structure may be provided for such a directory.

If an entry relating to a new cache access needs to be written into a region of the associative directory for which all of the ways are currently occupied, one entry needs to be deleted. In order to maintain the inclusive nature of the directory, this then involves the cache coherency controller instructing the relevant cache(s) to delete their correspondingly cached lines. This process may be referred to as a back invalidation. Back invalidations for correctly operating caches are generally undesirable as they can reduce the likelihood of cache hits, increasing the delay and power requirements for memory accesses.

SUMMARY

In an example arrangement there is provided a cache coherency controller comprising:

a directory indicating, for memory addresses cached by a group of two or more cache memories in a coherent cache structure, which of the cache memories are caching those memory addresses, the directory being associative so that multiple memory addresses map to an associative set of more than one directory entry; and control logic responsive to a memory address to be newly cached, and configured to detect whether one or more of the set of directory entries mapped to that memory address is available for storage of an indication of which of the two or more cache memories are caching that memory address;

the control logic being configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection amongst the two or more cache memories.

In another example arrangement there is provided a cache coherency controller comprising:

means for storing a directory indicating, for memory addresses cached by a group of two or more cache memories in a coherent cache structure, which of the cache memories are caching those memory addresses, the directory being associative so that multiple memory addresses map to an associative set of more than one directory entry;

means responsive to a memory address to be newly cached, for detecting whether one or more of the set of directory entries mapped to that memory address is available for storage of an indication of which of the two or more cache memories are caching that memory address; and means for selecting, when all of the set of directory entries mapped to that memory address are occupied, one of the set of directory entries as a directory entry to be overwritten and the corresponding cached information to be invalidated, in dependence upon which of the group of two or more cache memories is indicated by that directory entry, according to a likelihood of selection amongst the two or more cache memories.

In another example arrangement there is provided a cache coherent data communication device comprising such a cache coherency controller.

In another example arrangement there is provided a memory system comprising such a cache coherent data communication device; and a group of two or more cache memories each connected to the cache coherent data communication device.

In another example arrangement there is provided a method comprising:

storing a directory indicating, for memory addresses cached by a group of two or more cache memories in a coherent cache structure, which of the cache memories are caching those memory addresses, the directory being associative so that multiple memory addresses map to an associative set of more than one directory entry;

detecting, in response to a memory address to be newly cached, whether one or more of the set of directory entries mapped to that memory address is available for storage of an indication of which of the two or more cache memories are caching that memory address; and selecting, when all of the set of directory entries mapped to that memory address are occupied, one of the set of directory entries as a directory entry to be overwritten and the corresponding cached information to be invalidated, in dependence upon which of the group of two or more cache memories is indicated by that directory entry, according to a likelihood of selection amongst the two or more cache memories.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides a cache coherency controller comprising:

a directory indicating, for memory addresses cached by a group of two or more cache memories in a coherent cache structure, which of the cache memories are caching those memory addresses, the directory being associative so that multiple memory addresses map to an associative set of more than one directory entry; and control logic responsive to a memory address to be newly cached, and configured to detect whether one or more of the set of directory entries mapped to that memory address is available for storage of an indication of which of the two or more cache memories are caching that memory address;

the control logic being configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection amongst the two or more cache memories.

The present disclosure provides for a potentially adaptive back invalidation process (rather than an entirely pseudo-random process, for example) so as to target back invalidations towards one or more cache memories by applying respective likelihoods. The likelihoods may be predetermined but in example arrangements, the likelihoods are derived at least in part from a metric indicative of operation of one or more of the group of cache memories. The metric may be based on memory performance but in other examples the metric may be at least partially indicative of a cache memory which is not necessarily notifying its cache evictions properly to the controller. Back invalidations can therefore be targeted at least in part towards such cache memories. This has two potential advantageous effects. One is that correctly operating cache memories are less affected by back invalidations. The other is that a cache memory which is not properly signalling its evictions is itself less likely to be affected by a back invalidation (if the back invalidation in fact happens to relate to a cache line which has been evicted but not notified, there is little performance impact on that cache memory, in that there is no impact on the number of lines cached, though there might be a relatively minor impact through using cache tag access bandwidth).

The cache coherency controller may act to coordinate, amongst the cache memories, an access to a memory address by one of the cache memories when the directory indicates that another of the cache memories is caching that memory address.

In such cases, the cache coherency controller is configured to send a message to a cache memory which is indicated, by the directory, to be caching a memory address being accessed by another cache memory, and to receive a response from the cache memory which received the message, the response indicating whether that cache memory is actually caching that memory address. This in turn allows a detector to detect, for each of the group of two or more cache memories, instances of receipt of a response indicating that a cache memory is not caching a memory address indicated by the directory to be cached by that cache memory; the control logic being configured to set the likelihood of selection according to the detected number of instances in respect of each of the group of two or more cache memories. This allows back invalidations to be directed with higher likelihood towards a cache memory for which a snoop miss, indicating that the snoop directory was not correct in that entry, occurs. Snoop misses are a potential indicator of incorrect eviction notifications. This therefore represents an example of the control logic being configured to place a cache memory higher in the likelihood of selection, so that the control logic is more likely to select a directory entry relating to that cache memory for overwriting, in response to a detection, in respect of that cache memory, of a higher number of instances of receipt of a response indicating that a cache memory is not caching a memory address indicated by the directory to be cached by that cache memory.

In example arrangements, the cache coherency controller may comprise a detector configured to detect, for each of the group of two or more cache memories, instances of memory addresses being newly stored in that cache memory, and instances of memory addresses being evicted from that cache memory; the control logic being configured to set the likelihood of selection according to a relationship between the detected instances of memory addresses being newly stored in each cache memory and the detected instances of memory addresses being evicted from each cache memory.

To reduce the chance of incorrect detections or spurious operations, the control may be configured so as to disregard detections by the detector during an initial period of operation of a cache memory.

One example of a metric which may be used is that the control logic is configured to place a cache memory higher in the likelihood of selection, so that the control logic is more likely to select a directory entry relating to that cache memory for overwriting, in response to a detection of more instances of newly storing memory addresses in that cache memory than instances of evicting memory addresses from that cache memory. A detection of more writes than evictions could indicate that evictions are not being properly notified to the controller. Therefore, back invalidations can be made more likely for the incorrectly operating cache memory.

As an alternative to (or in addition to) detecting caching actions of the cache memories, the cache coherency controller can comprise a detector configured to detect an aspect of performance of one or more of the cache memories; the control logic being configured to set the likelihood of selection in response to the detected performance. An example of the aspect of performance is a data error rate, in which the control logic is configured to place a cache memory higher in the likelihood of selection, so that the control logic is more likely to select a directory entry relating to that cache memory for overwriting, in response to a detection of a higher data error rate in respect of that cache memory.

Example arrangements may be implemented as, for example, a cache coherent data communication device (such as an interconnect or a network on chip (NoC) device comprising a cache coherency controller as defined above.

Example arrangements may be implemented as a memory system comprising:

a cache coherent data communication device as defined above; and a group of two or more cache memories each connected to the cache coherent data communication device.

Figure 1:
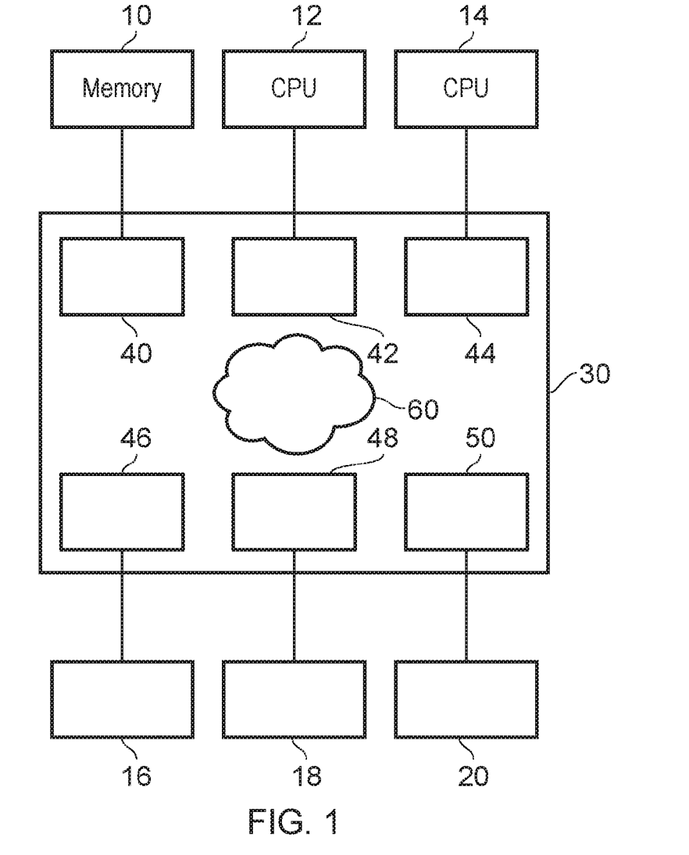
FIG. 1 schematically illustrates a data processing apparatus.

Referring now to the drawings, FIG. 1 schematically illustrates a data processing apparatus comprising: a plurality of data handling nodes 10, 12, 14, 16, 18, 20 and interconnect circuitry 30 connected to the plurality of data handling nodes. The interconnect circuitry comprises a plurality of interfaces 40, 42, 44, 46, 48, 50 each associated with a respective one of the data handling nodes, and data routing circuitry 60 for controlling and monitoring data handling transactions as between the various data handling nodes.

The data handling nodes 10 . . . 20 can be various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. Some of the data handling nodes may be configured as master nodes, and some as slave nodes, with the master/slave distinction indicating which nodes have control of data handling transactions as between those nodes.

The data processing apparatus of FIG. 1 may be implemented as a single integrated circuit, for example as a so-called system on a chip (SoC). Alternatively, the data processing apparatus of FIG. 1 may be implemented as multiple discrete and interconnected systems.

The interconnect circuitry is an example of a cache coherent data communication device. Another example (not shown, but considered as an embodiment of the present technology) is a so-called network on chip (NoC) system. The arrangement of FIG. 1 is an example of a memory system comprising: a cache coherent data communication device; and a group of two or more cache memories each connected to the cache coherent data communication device.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a memory device as one of the data handling nodes (such as the node 10). Other nodes (such as the nodes 12, 14) may be processing elements having their own respective caches which, depending on the nature of the processing element operations, may store one or more copies of data which is also held in the memory 10. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. The data routing circuitry 60 includes various mechanisms and circuitry to provide for coherent operation. Examples of these will be discussed below.

Figure 2:
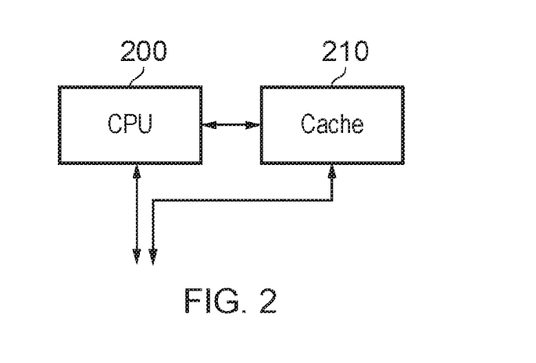
FIG. 2 schematically illustrates a data processing element and associated cache.

FIG. 2 schematically illustrates an example node in the arrangement of FIG. 1. In this example, a CPU 200 makes reference to data stored in an associated cache memory 210, with both the CPU 200 and the cache memory 210 being in communication with the interconnect circuitry 30. The cache memory 210 stores copies of information held in the memory 10. In some instances, the two copies can be the same, for example if a copy has been cached during a memory read operation. In other instances, circumstances could arise which would lead to copies differing from one another, for example if a data write operation has been carried out by the CPU 200 with respect to the copy of a data item stored in the cache 210. In a system of multiple caches, there is a need to ensure that before one version of a data item is accessed, any changes which have been implemented in respect of other versions are fully implemented for all copies.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this will be discussed below.

Figure 3:
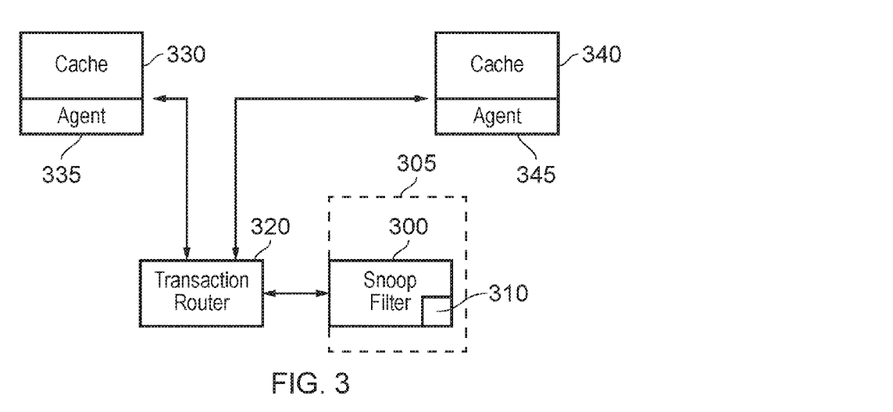
FIG. 3 schematically illustrates the operation of a cache coherency controller including a snoop filter.

FIG. 3 schematically illustrates the operation of cache coherency controller including a snoop filter.

The term "snoop filter" is a historical one and is used here to refer to a control device having an associated "directory", where the directory stores information indicating which data is stored in which cache, and the snoop filter itself at least contributes to the handling of data accesses to cached information so as to provide a cache coherence function.

The cache coherency controller includes the snoop filter in the present embodiments. The cache coherency controller may optionally provide other functionality. The snoop filter can provide some or all of the functionality relating to overseeing the handling of data accesses across a cache coherent system. Therefore, in some examples, the snoop filter can be considered as a cache coherency controller. In other examples, the cache coherency controller, including the snoop filter, provides an example of a cache coherency controller. The cache coherency controller and/or the snoop filter to be discussed below provide an example of control circuitry or control logic configured as discussed below.

In FIG. 3 a snoop filter 300, having the directory 310 as discussed above, forms part of a cache coherency controller 305 associated with a transaction router 320 forming part of the data routing circuitry 60. The transaction router 320 is in data communication with one or more cache memories (of which two examples 330, 340 are shown in FIG. 3). Each cache memory has an associated agent 335, 345 responsible for the local handling of data read and write operations with respect to that cache memory.

The snoop filter 300 handles at least a part of a process under which, when any of the data handling nodes 10 . . . 20 intends to access or modify data which is stored as a cache line in any of the cache memories, that node obtains permission to do so. As part of this process, the snoop filter 300 checks whether any other cache memories have a copy of the line which is to be modified. If any other copies are in existence at other cache memories, then those copies need to be cleared and invalidated. If those copies themselves contain modifications to the stored data in that line, then in at least some circumstances, the cache coherency controller 305 (or the snoop filter 300) instructs the cache memory to write that line back to main memory.

In the case of a read access by a node with respect to data stored in a cache memory, it is important that the node 10 . . . 20 requesting the read has access to the latest correct version of the cached data. The cache coherency controller 305 oversees this process so that if another cache has a recently-modified version of the required data, that other cache writes back the modified version and/or forwards a copy of the modified version for caching at the currently requesting node.

The cache coherency controller 305 including the snoop filter 300 therefore provides an example of a cache coherency controller configured to coordinate, amongst the cache memories, an access to a memory address by one of the cache memories when the directory indicates that another of the cache memories is caching that memory address.

A snoop operation provides an example of sending a message to a cache memory which is indicated, by the directory, to be caching a memory address being accessed by another cache memory, and to receive a response from the cache memory which received the message, the response indicating whether that cache memory is actually caching that memory address.

In examples of a data processing system of the type shown in FIG. 1, nearly all of the checks carried out by the snoop filter 300 would be expected to miss, which is to say they would not uncover replication of data between multiple caches. But nevertheless, the checks carried out by the snoop filter 300 are essential to maintaining cache coherence. In order to improve the efficiency of the process and to allow the snoop filter 300 to avoid making checks which are definitely going to miss, the snoop filter 300 maintains the directory 310 indicating to the snoop filter 300 which data is stored at which cache. Not only does this allow the snoop filter 300 to reduce the number of snoop operations (by avoiding carrying out such operations where a particular line is not held in any cache, or is held only at the cache corresponding to the node which is currently accessing that data) it also allows data communications relating to snoop operations to be better targeted (for example as unicast or multicast communications) to the appropriate cache(s) rather than to be broadcast as data transactions to all of the caches.

Therefore, when a potential snoop operation is initiated, the snoop filter 300 consults the directory 310 to detect whether the information in question is held in one or more of the caches. If a snoop operation is indeed needed to enquire as to the current status of the data at one or more caches, then the snoop filter 300 can carry out that enquiry as a unicast or multicast communication (rather than a broadcast communication) as appropriate.

The cache coherency controller 305 including the snoop filter 300 therefore provides an example of a cache coherency controller comprising: a directory (such as the directory 310) indicating, for memory addresses cached by a group of two or more cache memories in a coherent cache structure, which of the cache memories are caching those memory addresses, the directory being associative so that multiple memory addresses map to an associative set of more than one directory entry (in this example, the set has m entries where m is greater than one); and control logic responsive to a memory address to be newly cached, and configured to detect whether one or more of the set of directory entries mapped to that memory address is available for storage of an indication of which of the two or more cache memories are caching that memory address.

The snoop filter 300 is a so-called inclusive snoop filter which means that it has an ongoing requirement to maintain a complete listing of all data held by all of the caches which are subject to cache coherence. In order to do this, the snoop filter 300 (as part of the cache coherency controller 305) needs to be informed by an agent associated with a cache memory that a cache insertion has taken place. But in order to perform this function efficiently, it should also be informed by the agent if a cache line has been evicted (removed from) that cache memory, either as a simple deletion or invalidation (in the case of unmodified data) or as a write-back to main memory (for modified data). Signalling an eviction is the responsibility of the respective coherent agent. However, some operational protocols associated with multiple caches can recommend the signalling of evictions but do not necessarily mandate it. In any case, there may be circumstances whereby a cache memory may not always be able to signal all evictions because of software errors, for example in a virtual memory system, or memory errors.

In the present description, a "silent eviction" will refer to a block or other data item being evicted from a cache without the eviction event being signalled to the snoop directory.

In order to maintain the inclusive properties of the snoop filter directory 310, an entry must be provided in the directory 310 for each stored cache line. The structure of the directory 310 will be discussed further below, but in general terms it is possible that the directory 310 becomes full, at least in respect of regions of the directory 310 appropriate for storing a newly accessed cache line. This capacity problem can be exacerbated by the issue of silent evictions as discussed above. If a silent eviction takes place, the snoop filter 300 is unable to clear the corresponding entry from the directory 310, which means in turn the directory 310 is more likely to appear to be full when a new entry is required to be written into it.

A technique used by the snoop filter 300 to handle the issue of inadequate capacity for a newly created entry is to perform so-called "back-invalidations". Here, the cache coherency controller 305 or the snoop filter 300 selects an entry in the snoop filter directory 310 to be deleted (a so-called "victim" entry) and initiates eviction of the corresponding cache line from the respective cache(s). A high rate of back-invalidations is undesirable because it generally reduces cache occupancy and therefore cache hit rate and so can lead to a performance drop and a power increase, both due to increased main memory accesses. It can also increase execution times, because main memory accesses tend to be rather slower than cache memory accesses.

Embodiments of the present disclosure provide techniques for preferentially selecting cache memories to suffer back-invalidations based upon one or more properties of those cache memories and/or data accesses by those cache memories. Further details of these techniques will be discussed below.

Figure 4:
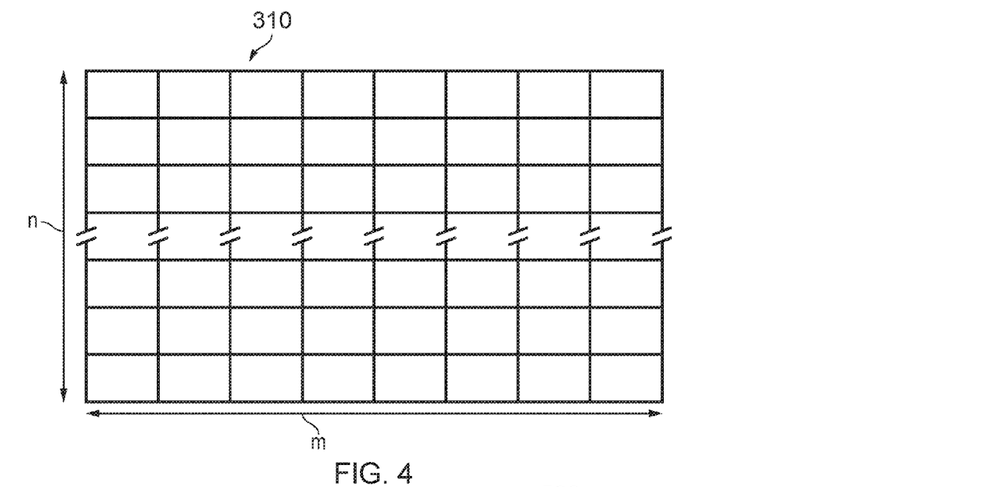
FIG. 4 schematically illustrates a snoop filter directory.

FIG. 4 schematically illustrates a snoop filter directory such as the directory 310. The snoop filter directory 310 is organised as an m-way associative group of n×m entries. Here, the number n×m of entries in the directory 310 may be set to, for example, 1.5× the total number of all cache lines in the cache coherent system. The number m of ways may be set to a lower number of ways than the associativity of each of the cache memories. Purely as an example, m could be 8 in a system having plural 16-way associative cache memories. Note that the present techniques are applicable to other associative structures such as so-called cuckoo caches.

Figure 5:
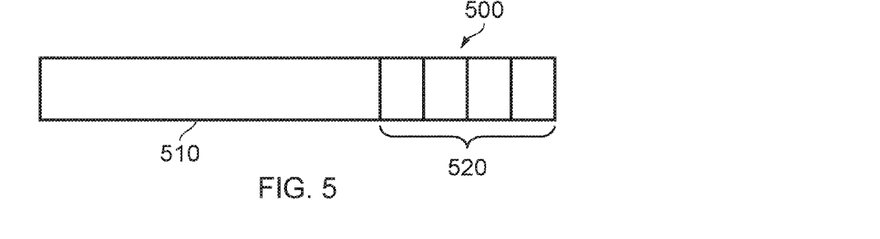
FIG. 5 schematically illustrates a snoop directory entry.

The associativity and the number of "ways" indicates that there are m possible locations for storage of any individual data item to be held by the directory 310. In the present example, the data items are referred to as snoop directory "entries", and FIG. 5 schematically illustrates a snoop directory entry 500. Note that in other associative structures such as structures in which the associativity is related or provided by multiple probes of the same structure, such as a so-called hash-rehash structure including a so-called cuckoo hash structure), the value m may not be fixed but may vary with operation. But at (at least) a single point in operation, the associativity provides a set of more than one directory entry as a location for a particular operation.

The snoop directory entry 500 comprises two portions: a tag 510 and a snoop vector 520.

The tag 510 forms part of the specification of which cache line (in other words, which region of the address space) is referred to by the snoop directory entry 500. In order to determine where a snoop directory entry is stored (or is to be stored) in the snoop directory 310, a part of the memory address relating to the cache line under discussion is used to select or index one of the n sets of entries of the directory 310. A remaining part of the memory address is used to generate the tag 510. For example, a number of most significant bits of the memory address may indicate which of the n sets of entries of the directory 310 the entry is to be stored in, with a further group of next-most significant bits forming the tag 510. Note here that the very least significant bits are not necessarily needed as part of a specification of the memory address of the cache line in question, because the cache line comprises data representing a number of memory addresses. For example, a cache line might comprise 8×32-bit data words, which means that the 5 least significant bits of the memory address are irrelevant to specifying the location of the cache line in the memory space.

Alternatively, a number of less significant bits could be used as the index, with a number of most significant bits forming the tag.

Hashing may be used in respect of any parts of the process discussed above, so as to introduce an irregular or pseudo-random distribution of locations in the directory 310 at which entries are stored, which in turn can avoid a problem of multiple cached structures having to be stored at adjacent indices in the directory 310.

Within a set of entries of the directory 310 selected according to the index derived from the memory address in question, an entry can be stored at any of the m "ways". When a new entry is to be stored in the directory 310, if there is a vacant way, then that way can be used to store the newly stored entry. If there are no vacant ways, then a back-invalidation process as mentioned above has to be carried out in order to provide a vacant way. This will be described in more detail below.

The snoop vector indicates which caches store the cache line defined (in address space) by the index and the tag. In the example shown in FIG. 5, the snoop vector is applicable to a system having four coherent caches and comprises four bits, each indicating (by a 1 or a 0) whether that cache line is held by a respective cache. For example, the format of the snoop vector might be as follows:

| Cache A | Cache B | Cache C | Cache D |
|---------|---------|---------|---------|
| 1 = stored, 0 = not stored | 1 = stored, 0 = not stored | 1 = stored, 0 = not stored | 1 = stored, 0 = not stored |

According to this format, a snoop vector expressed as (for example) 1001 would indicate that the cache line defined by the index and the tag is held by caches A and D, but not by caches B and C.

The snoop filter can maintain the contents of the snoop directory, because (as part of the coherence functionality) the snoop filter (or the cache coherency controller, which includes the snoop filter) is notified of any operations by which a cache memory acquires a copy of a cache line. Normally, the snoop filter is also notified of cache evictions, but as discussed above, there can be circumstances in which evictions are not properly notified.

A snoop vector of 0000 would indicate to a vacant entry in the snoop directory. The entry may remain even when the last cache holding that cache line performs an eviction, but the entry is then free to be overwritten by a newly created entry.

Of course, it should be noted that other formats could be used.

Figure 6:
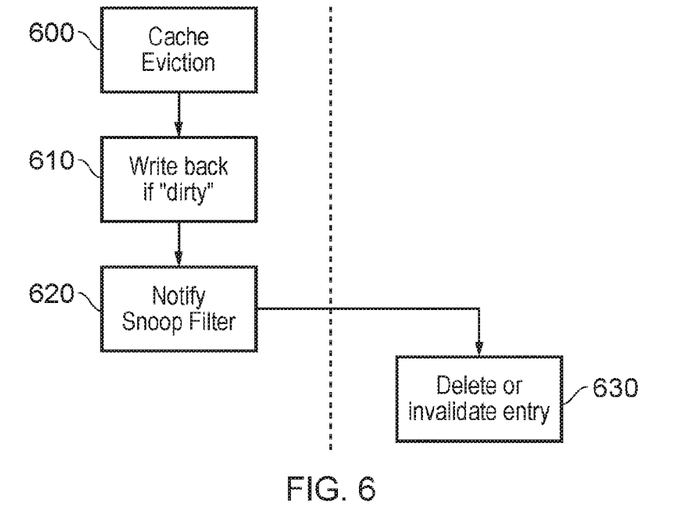
FIG. 6 is a schematic flowchart illustrating a cache eviction operation.

FIG. 6 is a schematic flow chart illustrating a cache eviction operation. Process steps are shown to the left side and the right side of a vertical broken line. Steps shown to the left side indicate matters carried out by a cache memory and/or its respective agent. Steps shown to the right side of the line indicate steps carried out by the snoop filter (as part of the cache coherency controller 305) or the cache coherency controller 305 (including the snoop filter 300) and/or the directory 310.

At a step 600, a cache eviction is initiated. There are various established reasons for requiring a cache eviction, either in response to a process carried out locally at the respective cache or in response to an instruction from the cache coherency controller 305. At a step 610, the contents of that cache line to be evicted are written back to main memory if they are "dirty", which is a term used to refer to cache line contents which have been modified with respect to the version originally retrieved from the main memory. At a step 620, the agent notifies the cache coherency controller 305 (and therefore the snoop filter) of the eviction and, at a step 630 the snoop filter deletes or at least invalidates the directory entry corresponding to that cache line at that cache. The step 630 can involve, for example, setting the relevant bit of the snoop vector corresponding to that cache line to zero.

As discussed above, if the step 620 failed to happen for any reason, the step 630 is not triggered and an unnecessary entry remains in the snoop filter directory 310.

Figure 7:
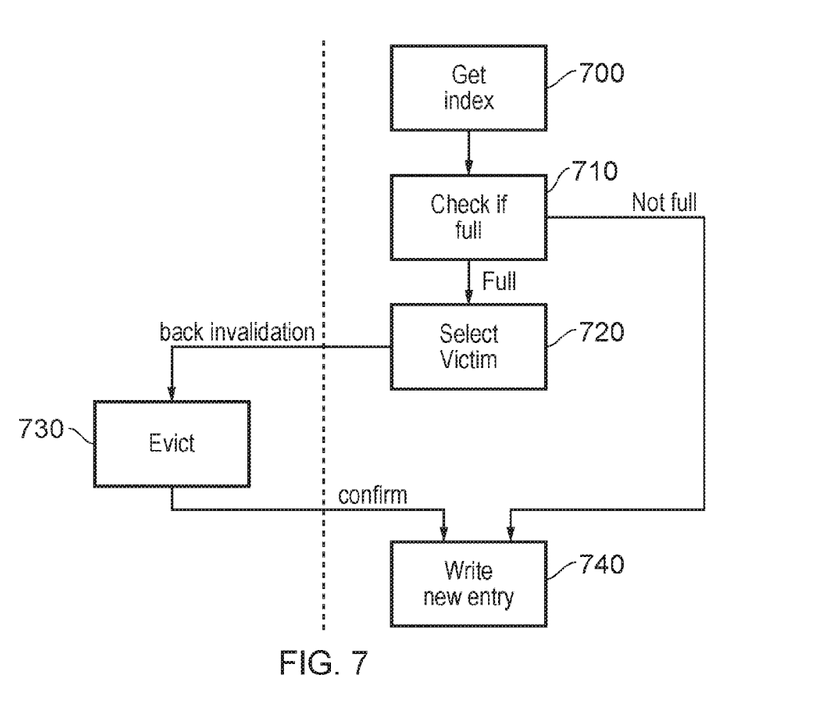
FIG. 7 is a schematic flowchart illustrating an operation to release an entry in the snoop filter directory.

FIG. 7 is a schematic flow chart illustrating an operation to release an entry and store a newly created entry in the snoop filter directory. This process refers to a snoop vector which is not currently held in the directory, and therefore refers to the generation of a directory entry in respect of the first of the caches to store a copy of a particular cache line.

At a step 700, an index value is derived from the address in the main memory space of the cache line to be stored in the directory 310. As discussed above, this may be part of the memory address of the cache line or may be dependent upon a hash or other value derived from that address. It indicates a set of entries (amongst n sets in the example shown in FIG. 4) of the directory the entry is to be stored in.

The tag is formed, for example from a remaining part of the address of that cache line.

At a step 710, the snoop filter checks whether all of the m entries relating to that index are full, which is to say that all of the m ways for that index are occupied by currently valid data. This test is fulfilled if all of the m ways contain respective entries having snoop vectors with at least one non-zero bit (according to the example format discussed above).

If so, then at a step 720 the snoop filter 300 selects a "victim" entry to be deleted and the cache coherency controller 305 initiates a back-validation of the corresponding cache line (to the victim entry) in any cache memories in which that cache line is recorded as being stored.

Operations in respect of one example cache memory is shown in FIG. 7 but there may be more than one for which a back invalidation is required. The cache memory or memories at which the corresponding cache line is stored carry out an eviction process (of the form shown in FIG. 6) with reference to that cache line and confirm having done so to the cache coherency controller 305. The snoop filter then writes the new entry to the newly vacant way at a step 740.

Returning to the step 710, if the check carried out at the step 710 revealed that the m entries corresponding to the detected index were not all full, then control passed directly to the step 740 where the new entry is simply written to a vacant way amongst those entries.

FIG. 7 therefore provides an example of a method comprising:

storing a directory indicating, for memory addresses cached by a group of two or more cache memories in a coherent cache structure, which of the cache memories are caching those memory addresses, the directory being associative so that multiple memory addresses map to an associative set of more than one directory entry (for example, a set of m directory entries, where m is greater than one);

detecting, in response to a memory address to be newly cached, whether one or more of the set of directory entries mapped to that memory address is available for storage of an indication of which of the two or more cache memories are caching that memory address; and selecting, when all of the set of directory entries mapped to that memory address are occupied, one of the set of directory entries as a directory entry to be overwritten and the corresponding cached information to be invalidated, in dependence upon which of the group of two or more cache memories is indicated by that directory entry, according to a likelihood of selection amongst the two or more cache memories.

In operating according to the techniques of FIG. 7 and those to be discussed below, the snoop filter 300 (and/or the cache coherency controller 305) provides an example of control logic configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection amongst the two or more cache memories.

Accordingly, FIG. 7 describes the back-invalidation process. A significant aspect of that process is the step 720 at which, in the case of a full set of entries in the directory 310, a victim entry is selected for deletion. It would be possible simply to use (for example) a pseudo-random victim selection technique, but in the case of a system in which one particular cache memory which, for whatever reason (such as poor software design or erroneous operation) was failing to properly notify cache evictions to the cache coherency controller 305 (and therefore to the snoop filter 300), a disproportionate burden could be placed on the other cache memories to have to handle back-invalidations in order to cope with the problem caused by one cache memory. So, in example embodiments to be discussed below, a victim selection arrangement other than a merely random or pseudo-random victim selection algorithm is used.

In example embodiments, the snoop operations of the snoop filter 300 are monitored. In the routine operation of the snoop filter 300, each time the snoop directory 310 predicts a snoop hit (which is to say, the snoop directory indicates that a cache is storing a copy of the cache line in question and so a snoop operation is carried out as part of the cache coherence maintenance), a snoop message is sent to the cache of the coherent agent where the hit is expected. Normally, in the absence of silent evictions, the result of the snoop enquiry is a hit, which is to say that the entry in the directory indicating that a particular cache lines was stored at that cache is correct. However, if a silent eviction or similar issue had occurred, the snoop enquiry could in fact be a miss meaning that although the directory 310 indicated that a particular cache line was cached, the cache in question did not hold that cache line. In an instance of a snoop miss, an event is asserted. These events are counted on a cache-by-cache basis. Victim selection can then take place on the basis of the detected counts. Acting in this way, the snoop filter 300 and/or the cache coherency controller 305 provides an example of a detector configured to detect, for each of the group of two or more cache memories, instances of receipt of a response indicating that a cache memory is not caching a memory address indicated by the directory to be cached by that cache memory; the control logic being configured to set the likelihood of selection according to the detected number of instances in respect of each of the group of two or more cache memories. For example, the control logic may be configured to place a cache memory higher in the likelihood of selection, so that the control logic is more likely to select a directory entry relating to that cache memory for overwriting, in response to a detection, in respect of that cache memory, of a higher number of instances of receipt of a response indicating that a cache memory is not caching a memory address indicated by the directory to be cached by that cache memory.

Figure 8:
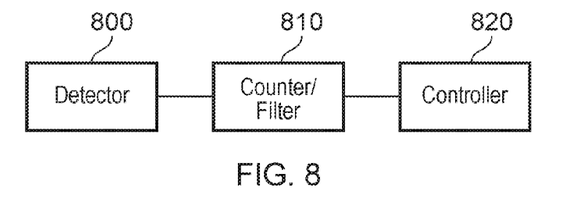
FIG. 8 schematically illustrates a part of a cache coherency controller.

Referring to FIG. 8 which schematically illustrates a part of the cache coherency controller 305, a detector 800 detects snoop misses as discussed above, and a counter/filter 810 counts and, as discussed below, optionally filters the counts on a cache-by-cache basis. A controller 820 controls the victim selection process corresponding to the step 720 discussed above.

The counts of snoop misses may be used directly or may be, for example, low-passed filtered. The counts can be used to set an order of priority for victim selection at the step 720, such that a higher count or filtered count indicates a higher priority for victim selection.

For example, using the four-cache (A . . . D) example discussed above, the count could be expressed as (using example figures) a total count of:

| A | B | C | D |
|---|---|---|---|
| 34 | 2 | 13 | 0 |

In this example, the cache A has the highest count, and the cache C the second highest. A snoop vector of 1000 indicates that only cache A holds a cache line. A snoop vector of 0010 indicates that only cache C holds a line. So purely by way of example, the controller 820 could control the victim selection step 720 so that:

(a) if any directory entry in the relevant set has a snoop vector of 1000, select that entry as victim;

(b) if not, if any directory entry in the relevant set has a snoop vector of 0010, select that entry;

(c) if not, if any directory entry in the relevant set has a snoop vector of 1010, select that entry;

(d) if not, select any entry in the set on a pseudorandom basis.

In this example, the operations (b) and/or (c) could be omitted, for example giving just two stages of operation (a) and (d).

These steps (a) to (d) provide examples of respective likelihoods (defined in turn by the count values) that different directory entries will be selected as victim. If a directory entry with a snoop vector of 1000 exists, then according to a direct application of steps (a) to (d) it will be selected (or if more than one exists with that snoop vector, one of them will be selected). But in other examples, the rules (a) to (d) or the raw counts could be combined with a pseudo-random selection so as to weight the selection towards particular potential victims, but still to allow a pseudo-random element in the selection. For example, two weighting values could be used, one dependent upon the count (for example, using the count itself or using a predetermined mapping of count values onto weighting values) and one dependent upon a pseudo-random value. The victim to be selected could then be that entry having the highest combined weighting (being for example the sum or product of the two weightings.)

In other examples, the counts could be filtered counts, for example using an infinite impulse response (IIR) filter such that at each snoop operation, or at each detected miss event across the set of caches, the prevailing count value for each cache is multiplied by a factor between zero and one, and the count value for a cache for which a miss has currently been detected is incremented. Alternatively, a finite impulse response filter technique could be used, for example by taking a rolling average of snoop misses for each cache across the last p snoop operations, or across the last q snoop misses (across all the caches), where p and q are predetermined integers. These operations would be carried out by the counter/filter 810.

Any or all of the above techniques could be used in conjunction with a count arrangement which ignores or disregards any detected snoop miss events for (say) a first or initial period of operation of a cache memory, or a first predetermined number of detected events.

As well as or instead of counting snoop misses, other metrics may be used and example of these will be discussed below.

Figure 9:
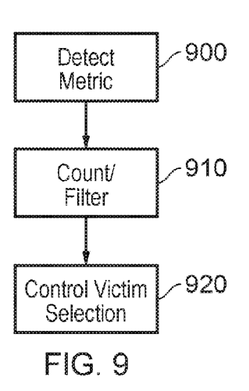
FIG. 9 is a schematic flowchart illustrating operations of the arrangement of FIG. 8.

In general terms, FIG. 9 is a schematic flow chart illustrating operations of the arrangement of FIG. 8 in which, at a step 900, a metric (for example, snoop misses, filtered snoop misses, or another metric such as one or more of those to be discussed below) is detected in respect of operations of the cache coherent system. At a step 910, the metric is counted and/or filtered as discussed above and, at a step 920, the victim selection process of the step 720 is controlled according to the results of the step 910.

FIG. 9 therefore provides an example of selecting, when all of the set of directory entries mapped to that memory address are occupied, one of the set of directory entries as a directory entry to be overwritten and the corresponding cached information to be invalidated, in dependence upon which of the group of two or more cache memories is indicated by that directory entry, according to a likelihood of selection amongst the two or more cache memories.

In operating according to the techniques of FIG. 9, the cache coherency controller 305 and/or the snoop filter 300 provides an example of control logic configured to set the likelihood of selection in response to detection of a metric indicative of operation of one or more of the group of cache memories.

Another example of a metric detected by the detector 800 at the step 900 is a discrepancy between cache insertions and cache invalidations or evictions by a particular cache. Normally, at least in a steady state operation, the number of cache insertions, or in other words newly written cache lines, would be expected to be similar to the number of cache evictions. If there is a large discrepancy, for example a discrepancy (above or below) by at least a threshold proportion (such as 20%) of the number of cache insertions detected so far or on a rolling basis, this could indicate a failure to properly signal evictions from that cache.

Acting in this way, the cache coherency controller 305 and/or the snoop filter 300 provides an example of a cache coherency controller comprising: a detector configured to detect, for each of the group of two or more cache memories, instances of memory addresses being newly stored in that cache memory, and instances of memory addresses being evicted from that cache memory; the control logic being configured to set the likelihood of selection according to a relationship between the detected instances of memory addresses being newly stored in each cache memory and the detected instances of memory addresses being evicted from each cache memory. For example, the control logic may be configured to place a cache memory higher in the likelihood of selection, so that the control logic is more likely to select a directory entry relating to that cache memory for overwriting, in response to a detection of more such instances in respect of that cache memory.

Figure 10:
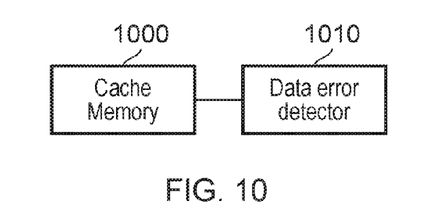
FIG. 10 schematically illustrates a cache memory and a data error detector.

FIG. 10 schematically illustrates a cache memory 1000 and a data error detector 1010, in the context of a system in which a metric for detection by the detector 800 at the step 900 may be the data error rate of each cache memory forming part of the cache coherent system. Here, a higher detected error rate (which may be filtered as discussed above, and/or which may have an initial period of operation disregarded as discussed above) would indicate a higher priority for back-invalidation of that cache memory. For example, of the example cache memories A . . . D discussed above, the victim selection step could be overseen by the controller 820 so that:

(a) if any directory entry in the relevant set has a snoop vector showing occupation by only the cache memory having the highest detected error rate, select that entry as victim;

(b) if not, select any entry in the set on a pseudorandom basis.

In further embodiments, the selection of victim or at least a priority order for victim selection can be established based upon the nature, use or properties of the individual cache memories.

Acting in this way, the cache coherency controller 305 and/or the snoop filter 300 provides an example of a detector configured to detect an aspect of performance of one or more of the cache memories; the control logic being configured to set the likelihood of selection in response to the detected performance. An example of the aspect of performance is a data error rate, in which case the control logic may be configured to place a cache memory higher in the likelihood of selection, so that the control logic is more likely to select a directory entry relating to that cache memory for overwriting, in response to a detection of a higher data error rate in respect of that cache memory.

For example, in an automotive application using multiple CPUs each handling different respective functions relating to the operation of a vehicle, cache memories relating to safety-critical functions could be prioritised so as not to be subject of back-invalidations, whereas cache memories relating to processes such as providing audio data for the user to listen to could be prioritised to suffer back-invalidations.

Figure 11:
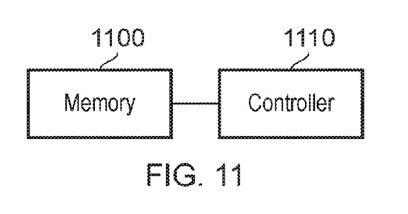
FIG. 11 schematically illustrates a memory and a memory controller.

FIG. 11 schematically illustrates a memory 1100 and a controller 1110, in which the memory 1100 stores information defining which cache memory should be prioritised for back-invalidation, and/or a priority order for back-invalidation, and the controller 1110 controls operation of the victim selection step 720 according to the priority information stored in the memory 1100.

For example, in the context of the example system discussed above, the stored data may indicate a priority order of A B C D, in which case an example mode of operation of the controller 1110 is:

(a) if any directory entry in the relevant set has a snoop vector of 1000, select that entry as victim;

(b) if not, if any directory entry in the relevant set has a snoop vector of 0100, select that entry;

(c) if not, if any directory entry in the relevant set has a snoop vector of 0010, select that entry;

(d) if not, if any directory entry in the relevant set has a snoop vector of 0001, select that entry;

(e) if not, select any entry in the set on a pseudorandom basis.

Figure 12:
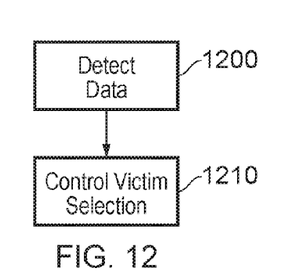
FIG. 12 is a schematic flowchart of a method of tag entry deletion.

This process is summarised by a schematic flow chart of FIG. 12, in which, at a step 1200 the controller 1110 detects data stored in the memory 1100 indicating a priority order for back invalidations, and at a step 1210 the controller 1110 controls victim selection according to the detected data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A cache coherency controller comprising:
a directory indicating, for memory addresses cached by a group of two or more cache memories in a coherent cache structure, which of the cache memories are caching those memory addresses, the directory being associative so that multiple memory addresses map to an associative set of more than one directory entry;
control logic responsive to a memory address to be newly cached, and configured to determine whether one or more of the set of directory entries mapped to that memory address is available for storage of an indication of which of the two or more cache memories are caching that memory address; and
a detector configured to detect an aspect of performance of one or more of the cache memories;
the control logic being configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection amongst the two or more cache memories; and
the control logic being configured to set the likelihood of selection in response to detection of a metric indicative of operation of one or more of the group of cache memories, the metric being the detected aspect of performance, in which the aspect of performance is a data error rate, in which the control logic is configured to place a cache memory higher in the likelihood of selection, so that the control logic is more likely to select a directory entry relating to that cache memory for overwriting, in response to a detection of a higher data error rate in respect of that cache memory.

2. A cache coherency controller according to claim 1, the cache coherency controller being configured to coordinate, amongst the cache memories, an access to a memory address by one of the cache memories when the directory indicates that another of the cache memories is caching that memory address.

3. A cache coherency controller according to claim 2, in which the cache coherency controller is configured to send a message to a cache memory which is indicated, by the directory, to be caching a memory address being accessed by another cache memory, and to receive a response from the cache memory which received the message, the response indicating whether that cache memory is actually caching that memory address.

4. A cache coherency controller according to claim 3, comprising:
a detector configured to detect, for each of the group of two or more cache memories, instances of receipt of a response indicating that a cache memory is not caching a memory address indicated by the directory to be cached by that cache memory;
the control logic being configured to set the likelihood of selection according to the detected number of instances in respect of each of the group of two or more cache memories.

5. A cache coherency controller according to claim 4, in which the control logic is configured to place a cache memory higher in the likelihood of selection, so that the control logic is more likely to select a directory entry relating to that cache memory for overwriting, in response to a detection, in respect of that cache memory, of a higher number of instances of receipt of a response indicating that a cache memory is not caching a memory address indicated by the directory to be cached by that cache memory.

6. A cache coherent data communication device comprising a cache coherency controller according to claim 1.

7. A memory system comprising:
a cache coherent data communication device according to claim 6; and
a group of two or more cache memories each connected to the cache coherent data communication device.

8. A cache coherency controller comprising:
a directory indicating, for memory addresses cached by a group of two or more cache memories in a coherent cache structure, which of the cache memories are caching those memory addresses, the directory being associative so that multiple memory addresses map to an associative set of more than one directory entry;
control logic responsive to a memory address to be newly cached, and configured to determine whether one or more of the set of directory entries mapped to that memory address is available for storage of an indication of which of the two or more cache memories are caching that memory address; and
a detector configured to detect, for each of the group of two or more cache memories, instances of memory addresses being newly stored in that cache memory, and instances of memory addresses being evicted from that cache memory;
the control logic being configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of two or more cache memories is indicated by that directory entry, according to a likelihood of selection among the two or more cache memories; and
the control logic being configured to set the likelihood of selection according to a relationship between the detected instances of memory addresses being newly stored in each cache memory and the detected instances of memory addresses being evicted from each cache memory.

9. A cache coherency controller according to claim 8, in which the control logic is configured so as to disregard detections by the detector during an initial period of operation of a cache memory.

10. A cache coherency controller according to claim 8, in which the control logic is configured to place a cache memory higher in the likelihood of selection, so that the control logic is more likely to select a directory entry relating to that cache memory for overwriting, in response to a detection of more instances of newly storing memory addresses in that cache memory than instances of evicting memory addresses from that cache memory.

11. A method comprising:
storing a directory indicating, for memory addresses cached by a group of two or more cache memories in a coherent cache structure, which of the cache memories are caching those memory addresses, the directory being associative so that multiple memory addresses map to an associative set of more than one directory entry;
detecting, in response to a memory address to be newly cached, whether one or more of the set of directory entries mapped to that memory address is available for storage of an indication of which of the two or more cache memories are caching that memory address;
detecting an aspect of performance of one or more of the cache memories; and
selecting, when all of the set of directory entries mapped to that memory address are occupied, one of the set of directory entries as a directory entry to be overwritten and the corresponding cached information to be invalidated, in dependence upon which of the group of two or more cache memories is indicated by that directory entry, according to a likelihood of selection amongst the two or more cache memories;
the selecting including setting the likelihood of selection in response to detection of a metric indicative of operation of one or more of the group of cache memories, the metric being the detected aspect of performance, in which the aspect of performance is a data error rate, in which the selecting includes placing a cache memory higher in the likelihood of selection so that the selecting is more likely to select a directory entry relating to that cache memory for overwriting, in response to a detection of a higher data error rate with respect to that cache memory.

\* \* \* \* \*